(12) United States Patent
Hao (10) Patent No.: US 12,474,960 B2
(45) Date of Patent: Nov. 18, 2025

(54) PROCESSING OF CONTROLLER-STATE-MESSAGE QUERIES

(71) Applicant: Ruckus IP Holdings LLC, Claremont, NC (US)

(72) Inventor: Po-Han Hao, Taipei (TW)

(73) Assignee: Ruckus IP Holdings LLC, Claremont, NC (US)

( * ) Notice: Subject to any disclaimer, the term of this patent is extended or adjusted under 35 U.S.C. 154(b) by 576 days.

(21) Appl. No.: 17/940,284

(22) Filed: Sep. 8, 2022

(65) Prior Publication Data

US 2023/0079551 A1     Mar. 16, 2023

Related U.S. Application Data

(60) Provisional application No. 63/242,543, filed on Sep. 10, 2021.

(51) Int. Cl.
*G06F 9/50*     (2006.01)
(52) U.S. Cl.
CPC ................ *G06F 9/5027* (2013.01)
(58) Field of Classification Search
None
See application file for complete search history.

(56) References Cited

U.S. PATENT DOCUMENTS

| | | | | |
|---|---|---|---|---|
| 6,975,638 | B1 * | 12/2005 | Chen | H04L 47/215 370/232 |
| 10,542,077 | B1 * | 1/2020 | Balakrishnan | H04L 67/1001 |
| 2002/0069271 | A1 * | 6/2002 | Tindal | H04L 41/0893 709/224 |
| 2003/0016664 | A1 * | 1/2003 | MeLampy | H04L 65/1101 370/389 |
| 2003/0191989 | A1 * | 10/2003 | O'Sullivan | H04L 41/0631 714/47.2 |
| 2003/0224775 | A1 * | 12/2003 | Suda | H04W 36/12 455/424 |
| 2017/0099662 | A1 * | 4/2017 | Thubert | H04L 63/0407 |
| 2020/0396147 | A1 * | 12/2020 | Han | H04W 24/04 |
| 2023/0068902 | A1 * | 3/2023 | Seely | H04L 47/12 |

FOREIGN PATENT DOCUMENTS

| | | | | |
|---|---|---|---|---|
| CN | | 110115057 A * | 8/2019 | ......... H04L 41/0654 |
| JP | WO 2016132402 A1 * | | 8/2016 | ............ H04L 12/44 |

* cited by examiner

*Primary Examiner* — Charles E Anya
(74) *Attorney, Agent, or Firm* — Steven Stupp (57) ABSTRACT

A computer system that processes state messages is described. During operation, the computer system receives, associated with communication network devices in a network, the state messages, where the state messages include different types of state messages having associated priorities. Then, the computer system computes identifiers of the state messages based at least in part on second identifiers of clients associated with or connected to the communication network devices, where, for a given state message, the computer system computes an identifier of the given state message based at least in part on a second identifier of a given client associated with information in the given state message. Next, the computer system may selectively assign the state messages to dedicated message queues having associated processing priorities based at least in part on the computed second identifiers and/or the types of state messages.

20 Claims, 7 Drawing Sheets

PROCESSING OF CONTROLLER-STATE-MESSAGE QUERIES

CROSS REFERENCE TO RELATED APPLICATIONS

This application claims priority under 35 U.S.C. 119(e) to U.S. Provisional Application Ser. No. 63/242,543, "Processing of Controller-State-Message Queries," filed on Sep. 10, 2021, by Po-Han Hao, the contents of which are herein incorporated by reference.

FIELD

The described embodiments relate to techniques for processing of state messages based on message order and/or priority.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

In an enterprise Wi-Fi network, there is typically a controller that manages communication network devices (such as access points, switches and/or routers), e.g., by providing configuration management, user authentication, events/alarms reports, statistics reports, and/or monitors access-point functions. For example, a given communication network device may periodically report statistics and/or events (which are collectively sometimes referred to as 'state messages') to a controller. Consequently, in large deployments, with multiple communication network devices, there will be multiple periodic state messages reported to the controller.

Because clients or stations often join or leave a Wi-Fi network on a short time scale (e.g., a few seconds), it is typically important for state messages to be processed in order so that correct statistics are collected and/or presented in a dashboard to a network operator. Moreover, because there are sometimes problems or changes in a Wi-Fi network (such as when loading is exceeded or when a client joins or leaves the network), it is also usually important for higher-priority state messages to be processed first. However, it can be difficult to correctly process large numbers of state messages, while allowing higher-priority state messages to be processed out of order, as needed.

SUMMARY

A computer system that processes state messages is described. This computer system may include an interface circuit that communicates with communication network devices (such as one or more access points, one or more switches and/or one or more routers) in a network. During operation, the computer system receives, associated with the communication network devices, the state messages, where the state messages include different types of state messages having associated priorities. Then, the computer system computes identifiers of the state messages based at least in part on second identifiers of clients that are associated with or connected to the communication network devices, where, for a given state message, the computer system computes an identifier of the given state message based at least in part on a second identifier of a given client that is associated with the information in the given state message. Next, the computer system selectively assigns the state messages to dedicated message queues having associated processing priorities based at least in part on the computed second identifiers and/or the types of state messages.

Note that the types of state message include report messages and event messages. Moreover, a given report message may include operating statistics of the given communication network device during a time interval. Furthermore, the event messages may have a higher priority than the report messages. Therefore, one or more of the dedicated message queues associated with the event messages may have higher priority than a remainder of the dedicated message queues, and the computer system may process the state messages in the one or more of the dedicated message queues with a smaller processing time than the state messages in the remainder of the dedicated message queues.

Additionally, the computer system may ensure that event messages in the state messages are not lost during processing. However, when a report message in the state messages is lost, the computer system may receive, associated with a communication network device, another instance of the report message.

In some embodiments, the second identifier may include a media access control (MAC) address and/or the identifier may be a function of the MAC address. For example, the second identifier may be computed by performing a hash of the MAC address. Note that the second identifiers may be integers.

Moreover, the dedicated message queues may be associated with subsets of the communication network devices, where a given dedicated message queue is associated with a given subset of the communication network devices.

Furthermore, one or more of the dedicated message queues having a higher priority than a remainder of the dedicated message queues and the computer system may process the state messages in the one or more of the dedicated message queues before the state messages in the remainder of the dedicated message queues. Additionally, the computer system may process the state messages in a given dedicated message queue in order.

In some embodiments, the state messages are received from a controller in the network.

Note that the dedicated message queues may be associated with consumers that further process the state messages.

Another embodiment provides a computer-readable storage medium with program instructions for use with the computer system. When executed by the computer system, the program instructions cause the computer system to perform at least some of the aforementioned operations in one or more of the preceding embodiments.

Another embodiment provides a method, which may be performed by the computer system. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A computer system that processes state messages is described. During operation, the computer system receives, associated with communication network devices in a network, the state messages, where the state messages include different types of state messages having associated priorities. Then, the computer system computes identifiers of the state messages based at least in part on second identifiers of clients that are associated with or connected to the communication network devices, where, for a given state message, the computer system computes an identifier of the given state message based at least in part on a second identifier of a given client that is associated with the information in the given state message. Next, the computer system may selectively assign the state messages to dedicated message queues having associated processing priorities based at least in part on the computed second identifiers and/or the types of state messages.

By selectively assigning the state messages to the dedicated message queues, these communication techniques may facilitate processing of the state messages. Notably, the computer system may process event messages in the state messages, which have higher priority, before processing report messages in the state messages. Moreover, the computer system may process the state messages in a given dedicated message queue in order (such as an order in which the state messages were received). These capabilities may ensure that the computer system does not loose any of the event messages during processing, while also ensuring that report messages are processed correctly. Consequently, the communication techniques may allow the computer system to collect correct statistics about performance of the network and that higher-priority state messages (such as event messages associated with client behavior in the network, e.g., joining or leaving the network) are processed out of order, as needed. Therefore, the communication techniques may increase the satisfaction of users of the network and/or the computer system, such as network operators and/or customers.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

Figure 1:
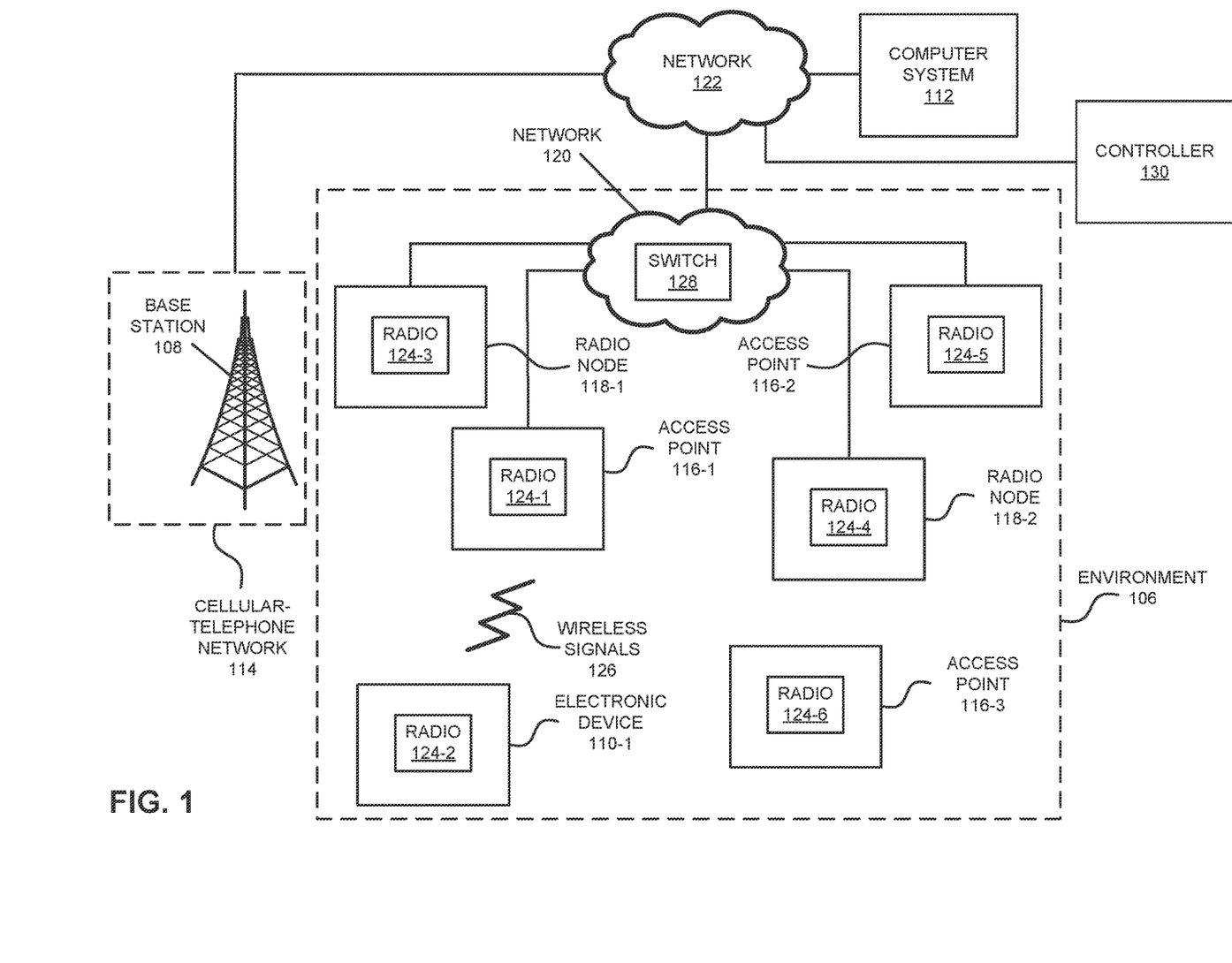
FIG. 1 is a block diagram illustrating an example of communication among electronic devices in accordance with an embodiment of the present disclosure.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, computer system 112 and/or controller 130 (which may be a local or a cloud-based controller that manages and/or configures access points 116, radio nodes 118 and/or switch 128, or that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 7:
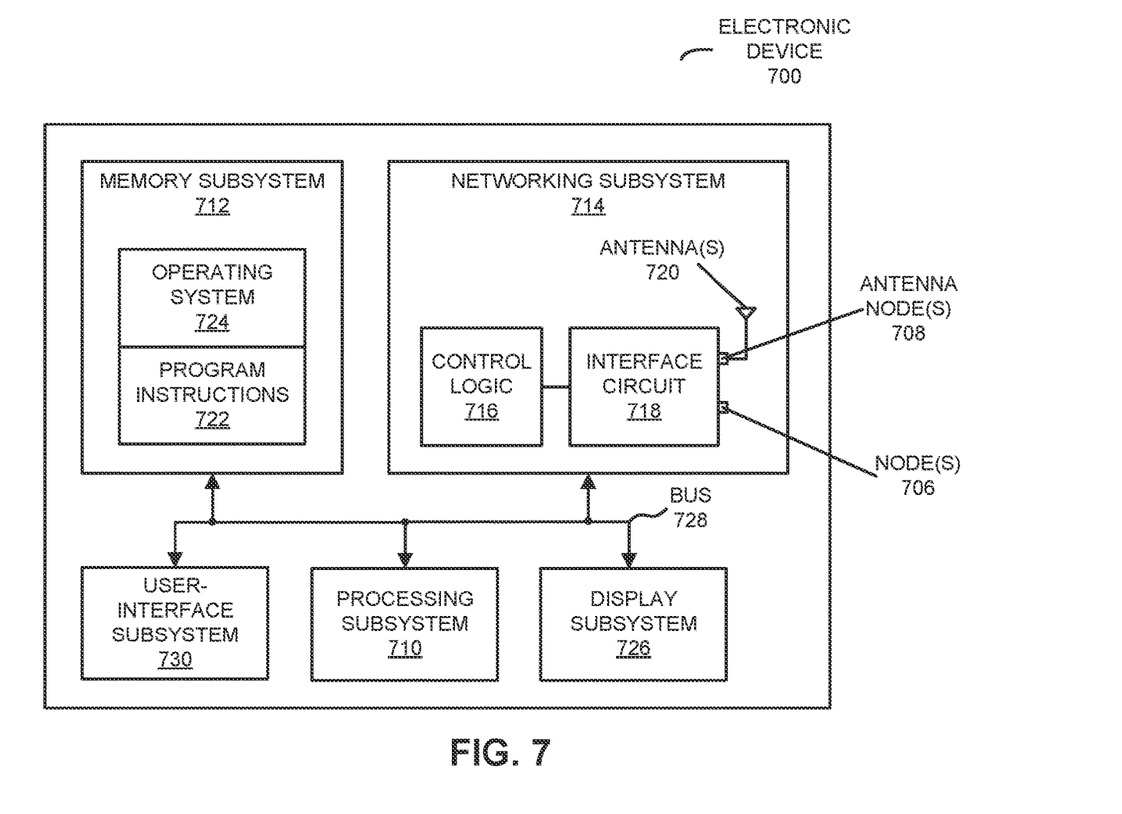
FIG. 7 is a block diagram illustrating an example of an electronic device in accordance with an embodiment of the present disclosure.

As described further below with reference to FIG. 7, electronic devices 110, computer system 112, access points 116, radio nodes 118, switch 128 and controller 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to correctly process large numbers of state messages, while allowing higher-priority state messages to be processed out of order, as needed. Moreover, as described further below with reference to FIGS. 2-6, in order to addresses these difficulties, computer system 112 (which may include one or more computers) may implemented one or more embodiments of the communication techniques. Notably, one or more communication network devices (such as one or more access points 116, one or more radio nodes 118 and/or switch 128) may routinely provide state messages (such as report messages and/or event messages) to computer system 112 via controller 130. Note that different types of state messages may have different priorities. For example, event messages may have higher priorities than report messages.

After receiving the state messages, computer system 112 may compute identifiers of the state messages based at least in part on second identifiers of clients that are associated with or connected to the communication network devices (such as electronic device 110-1), where, for a given state message, computer system 112 computes an identifier of the given state message based at least in part on a second identifier of a given client that is associated with the information in the given state message (e.g., the given state message may include information about network access by the client). For example, the second identifier may include a MAC address and/or the identifier may be a function of the MAC address. Notably, the second identifier may be computed by performing a hash of the MAC address.

Next, computer system 112 may selectively assign the state messages to dedicated message queues having associated processing priorities based at least in part on the computed second identifiers and/or the types of state messages. Notably, the dedicated message queues may be associated with subsets of the communication network devices, where a given dedicated message queue is associated with a given subset of the communication network devices. Thus, a dedicated message queue may be used by a group of one or more communication network devices. This may help ensure that the dedicated message queues may not be overloaded.

Alternatively or additionally, one or more of the dedicated message queues associated with event messages may have higher priority than a remainder of the dedicated message queues (and which may be associated with report messages). Computer system 112 may process the state messages in the one or more of the dedicated message queues with a smaller processing time (or more rapidly) than the state messages in the remainder of the dedicated message queues. For example, computer system 112 may process the state messages in the one or more of the dedicated message queues before the state messages in the remainder of the dedicated message queues. Additionally, computer system 112 may process the state messages in a given dedicated message queue in order (such as in an order in which the state messages are received). This may help ensure the state messages are processed correctly, e.g., in order, while allowing more expedited processing of higher-priority event messages.

In these ways, the communication techniques may ensure that the event messages in the state messages are processed before the report messages in the state messages. Moreover, the computer system may process the state messages in a given dedicated message queue in order (such as an order in which the state messages were received). These capabilities may ensure that the computer system does not lose any of the event messages during processing, while also ensuring that report messages are processed correctly. Consequently, the communication techniques may allow the computer system to collect correct statistics about performance of the network and that higher-priority state messages (such as event messages associated with client behavior in the network, e.g., joining or leaving the network) are processed out of order, as needed.

Figure 2:
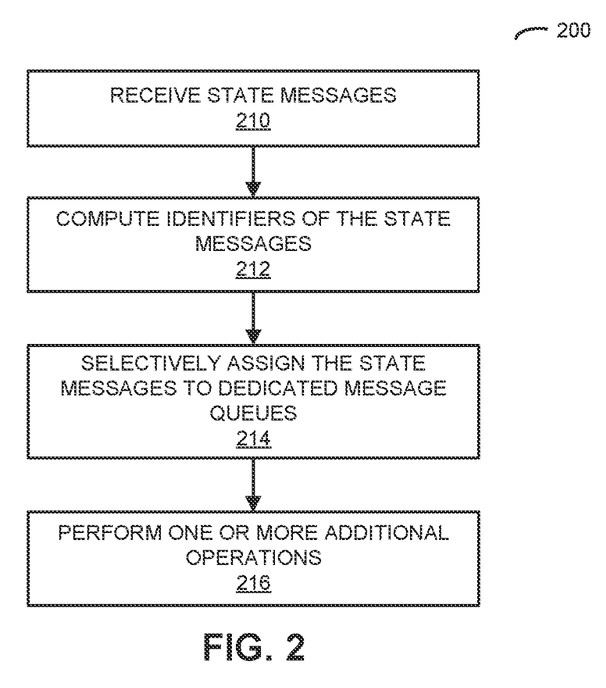
FIG. 2 is a flow diagram illustrating an example of a method for assigning state messages to dedicated message queues using a computer system in FIG. 1 in accordance with an embodiment of the present disclosure.

We now describe embodiments of the method. FIG. 2 presents a flow diagram illustrating an example of a method 200 for assigning state messages to dedicated message queues, which may be performed by a computer system (such as computer system 112). During operation, the computer system may receive, associated with communication network devices in a network, the state messages (operation 210), where the state messages include different types of state messages having associated priorities.

Then, the computer system may compute identifiers of the state messages (operation 212) based at least in part on second identifiers of clients that are associated with or connected to the communication network devices, where, for a given state message, the computer system computes an identifier of the given state message based at least in part on a second identifier of a given client that is associated with the information in the given state message.

Next, the computer system may selectively assign the state messages to the dedicated message queues (operation 214) having associated processing priorities based at least in part on the computed second identifiers and/or the types of state messages.

In some embodiments, the computer system optionally performs one or more additional operations (operation 216). Note that the types of state message include report messages and event messages. Moreover, a given report message may include operating statistics of the given communication network device during a time interval, and a given event message may include information associated with an event or a problem in the network. Furthermore, the event messages may have a higher priority than the report messages. Therefore, one or more of the dedicated message queues associated with the event messages may have higher priority than a remainder of the dedicated message queues, and the computer system may process the state messages in the one or more of the dedicated message queues with a smaller processing time than the state messages in the remainder of the dedicated message queues. Alternatively or additionally, the computer system may process the state messages in the one or more of the dedicated message queues before the state messages in the remainder of the dedicated message queues. In some embodiments, the computer system may process the state messages in a given dedicated message queue in order.

Moreover, the computer system may ensure that event messages in the state messages are not lost during processing. However, when a report message in the state messages is lost, the computer system may receive, associated with a communication network device, another instance of the report message.

Furthermore, the second identifier may include a MAC address and/or the identifier may be a function of the MAC address. For example, the second identifier may be computed by performing a hash of the MAC address. Note that the second identifiers may be integers (such as non-zero integers).

Additionally, the dedicated message queues may be associated with subsets of the communication network devices, where a given dedicated message queue is associated with a given subset of the communication network devices. Thus, a dedicated message queue may be used by a group of one or more communication network devices.

In some embodiments, the state messages are received from a controller in the network. Moreover, the dedicated message queues may be associated with consumers (e.g., in the computer system) that further process the state messages. For example, a consumer may include a cloud-based analytics service.

In some embodiments of method 200, there may be additional or fewer operations. Furthermore, the order of the operations may be changed, and/or two or more operations may be combined into a single operation. For example, in some embodiments, at least some of the operations in the communication techniques may be performed by controller 130. Thus, in some embodiments, the communication techniques may be performed in a centralized and/or a distributed manner.

Figure 3:
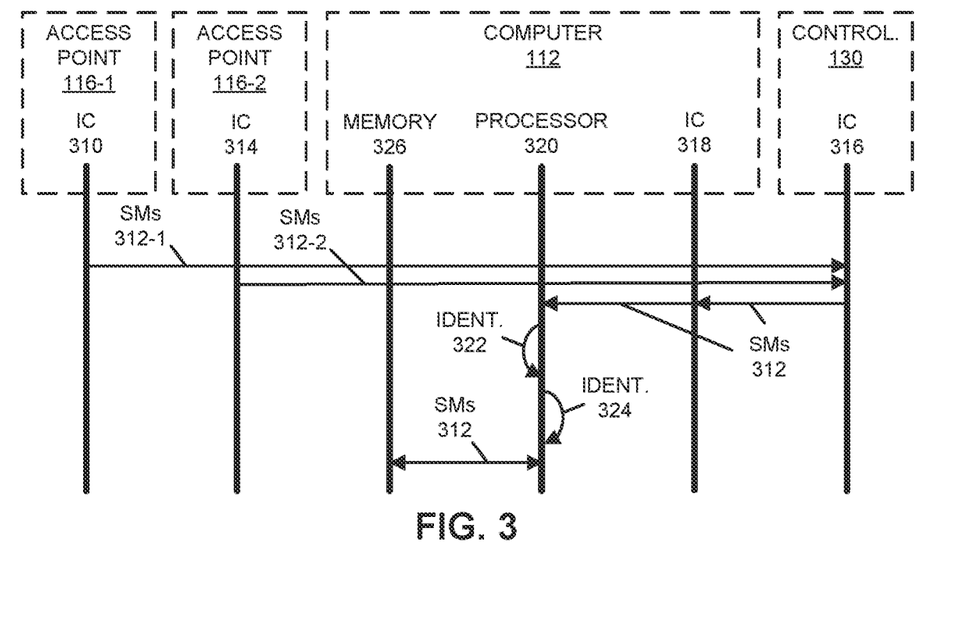
FIG. 3 is a drawing illustrating an example of communication among access points, a computer system and a controller in FIG. 1 in accordance with an embodiment of the present disclosure.

Embodiments of the communication techniques are further illustrated in FIG. 3, which presents a drawing illustrating an example of communication among access points 116, computer system 112 and controller 130. An interface circuit (IC) 310 in access point 116-1 may provide one or more state messages (SMs) 312-1 to controller 130, where the one or more state messages 312-1 include different types of state messages having associated priorities. For example, the types of state message include report messages and event messages. Moreover, the event messages may have a higher priority than the report messages. Furthermore, an interface circuit 314 in access point 116-2 may provide one or more state messages 312-2 to controller 130.

After or while receiving state messages 312 from access points 116, an interface circuit 316 in controller 130 may provide state messages 312 to computer system 112. Moreover, after receiving state messages 312, an interface circuit 318 in computer system 112 may provide state messages 312 to a processor 320 in computer system 112.

Processor 320 may compute identifiers 324 of state messages 312 based at least in part on identifiers 322 of clients that are associated with or connected to access points 116 (which may be included in state messages 312), where, for a given state message, computer system 112 computes an identifier of the given state message based at least in part on an identifier of a given client associated with information in the given state message. For example, the identifier of the given access point may include a MAC address and the identifier of the given state message may be a function of the MAC address. In some embodiments, processor 320 may compute the identifier of the given state message by performing a hash of the MAC address of the given client.

Next, processor 320 may selectively assign state messages 312 to dedicated message queues in memory 326 in computer system 112 based at least in part on the computer identifiers 324 and/or the types of state messages, where the dedicated message queues have associated processing priorities. For example, one or more of the dedicated message queues associated with the event messages may have higher priority than a remainder of the dedicated message queues, and processor 320 may process the state messages in the one or more of the dedicated message queues with a smaller processing time than the state messages in the remainder of the dedicated message queues. Alternatively or additionally, processor 320 may process the state messages in the one or more of the dedicated message queues before the state messages in the remainder of the dedicated message queues. In some embodiments, processor 320 may process the state messages in a given dedicated message queue in order (e.g., the given dedicated message queue may include a first-in, first-out buffer or FIFO).

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

We now further describe the communication techniques. Communication network devices periodically (such as every 90 s or 180 s) report statistics and/or events to a controller. For example, the state messages may include information, such as: a number of cloud connections, network usage, applications being used by users (e.g., a Web browser), etc. Note that event messages may depend on client behavior (such as when a client joints or leaves a network), while report messages (which include status information) may be triggered by a given communication network device.

A computer system in or associated with the controller (which is sometimes referred to as a 'statistics handler') may process these state message in the correct order while allowing higher-priority state messages (such as event messages) to be processed immediately when they are received (and, thus, potentially before some of the report messages that were previously received by the computer system, but which have not been processed yet). Note that a network administrator (or operator) or a customer may provide queries for statistics or status information based at least in part on the state messages, or the computer system may display information about the network (e.g., in a dashboard) based at least in part on the state messages. This may allow the network operator or the customer to monitor a network. In order to ensure that the responses to these queries or the displayed information about the network is accurate/correct, the computer system may use the communication techniques to process report messages in order, while expediting processing of higher-priority messages (such as event messages).

Figure 4:
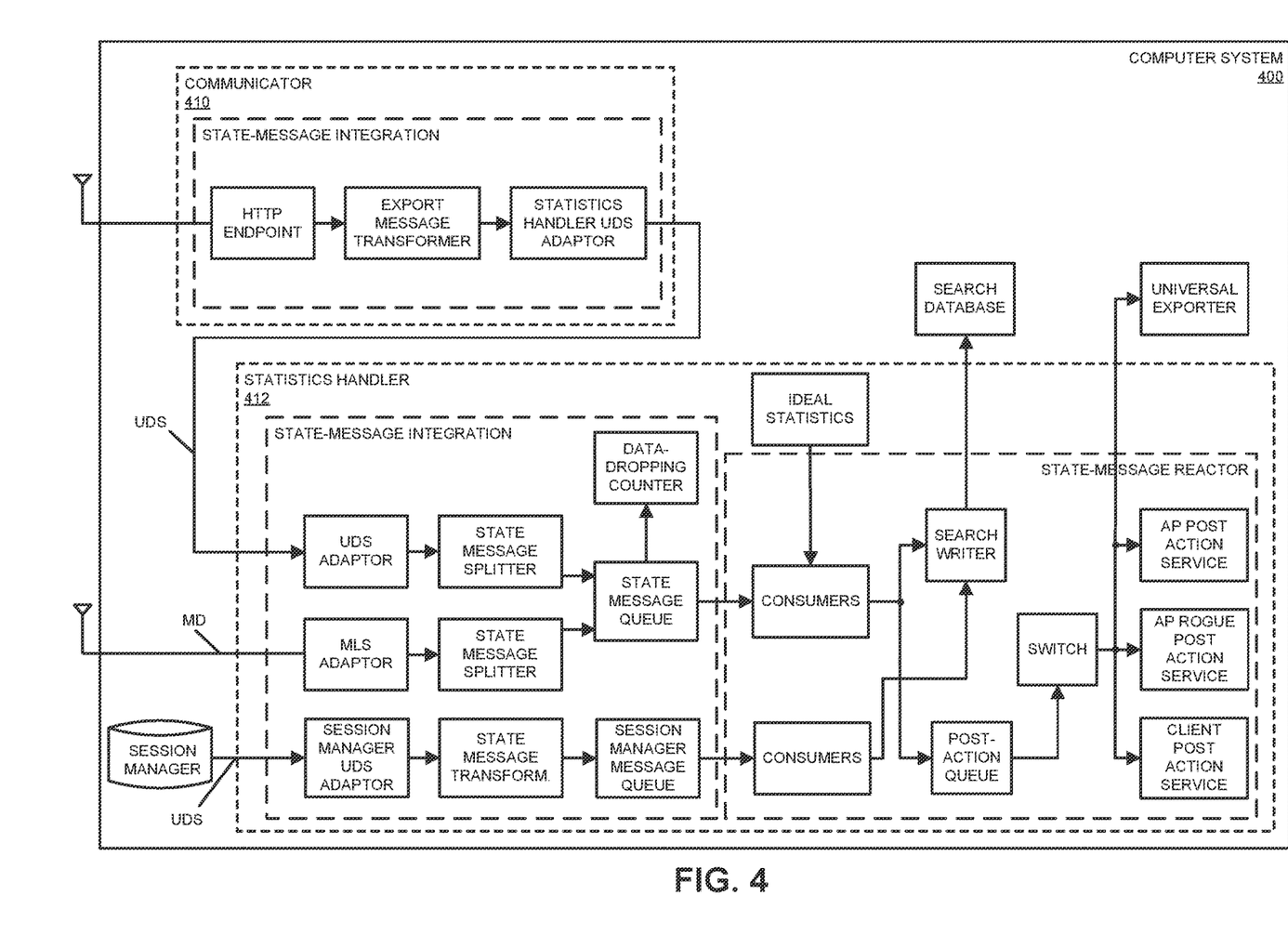
FIG. 4 is a drawing illustrating an example of a computer system in accordance with an embodiment of the present disclosure.

FIG. 4 presents a drawing illustrating an example of a computer system 400, including a communicator 410 (such as an interface circuit) and a statistics handler 412.

Note that state messages from the communication network devices may arrive in order and, in general, may be processed by the computer system in the same order. For example, when clients join and/or leave within few seconds, the computer system may need to guarantee that state messages are processed in order to prevent incorrect data or statistic being displayed on a dashboard. For example, two event messages may be:
2021 05 04 22:21: 39,258 Client[00:90:B1:00:00: JOIN; and
2021 05 04 22:21: 41,657 Client[00:90:B1:00:00: LEAVE.

Moreover, state messages of a given type may have associated priorities, which, in general, are different depending on the type of state message. Ideally, the computer system may process state message as soon as possible. However, when there is a problem in the network (such as exceeding system loading) or a change in the number of clients or stations in the network, the computer system may need to be able to process such as critical state message (e.g., an event message) before other state messages.

Figure 5:
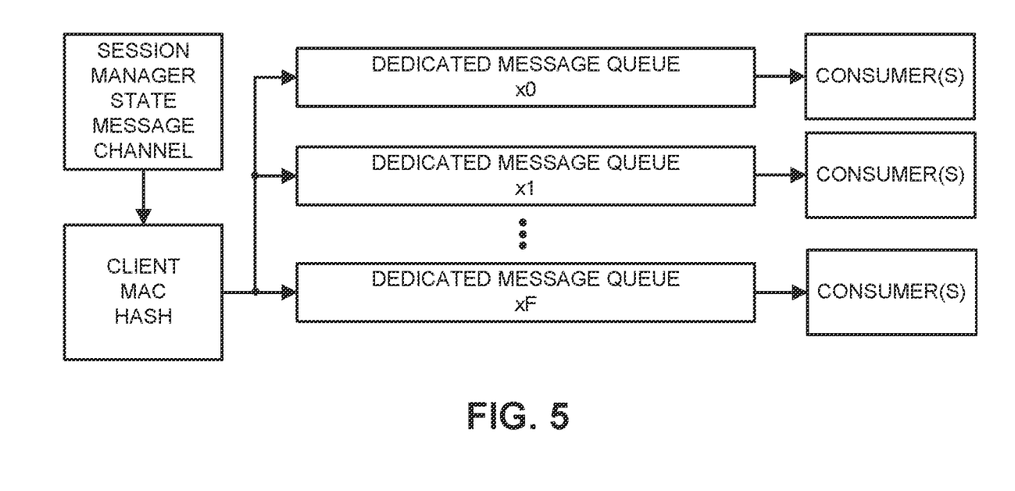
FIG. 5 is a drawing illustrating an example of assigning state messages to dedicated message queues in accordance with an embodiment of the present disclosure.

In order to address these challenges, in the communication techniques the computer system may assign the state messages to dedicated message queues based at least in part on the computed identifiers (e.g., using a hash function, such as a Java hash). This is shown in FIG. 5, which present a drawing illustrating an example of assigning state messages to dedicated message queues. Notably, arriving state messages may be 'categorized' or 'classified' in such a way that the category becomes a unit of scale for the computer system. For example, the computer system may use the MAC address of clients or stations (that are associated with or connected to communication network devices in a network, and which are included in the state messages) to categorize state messages. This may allow the computer system to process the state messages in order. Notably, state messages from a given subset of the communication network devices may be assigned to a given dedicated message queue based at least in part on the computer identifier. This may help ensure that the dedicated message queues do not become overloaded. Note that the given dedicated message queue may be associated one or more consumers, e.g., in the computer system. In some embodiments, a consumer may gather information in state messages to update a displayed dashboard. More generally, a consumer may process state messages in one or more of the dedicated message queues.

Moreover, the computer system may allocate dedicated resource (such as the dedicated message queues) to handle state messages having different levels of priority. For example, the computer system may allocate more resources (such as more consumers, more dedicated message queues and/or queue capacity) to a higher-priority type of state message (such as event messages), which may be less tolerant of data loss. This may help ensure that there are more opportunities for such higher-priority types of state messages to be processed before remaining state messages.

Figure 6:
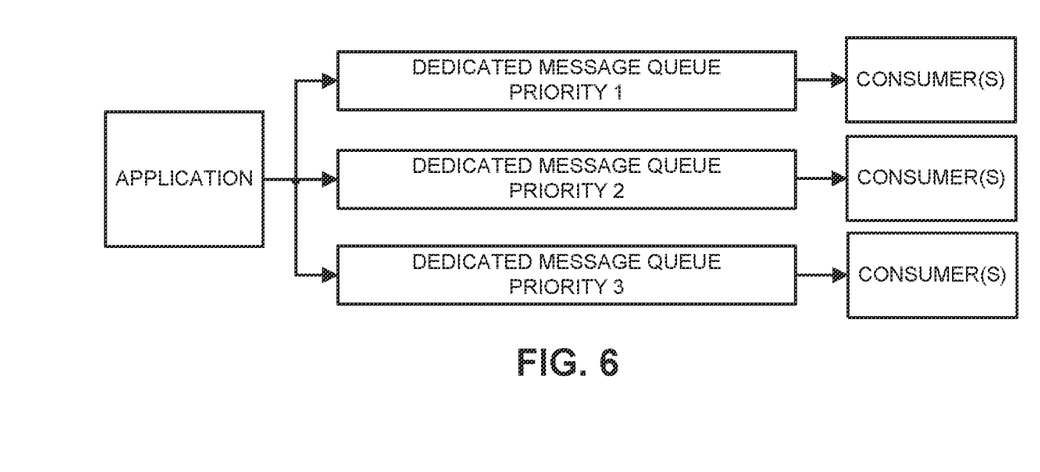
FIG. 6 is a drawing illustrating an example of assigning state messages to dedicated message queues in accordance with an embodiment of the present disclosure.

FIG. 6 presents a drawing illustrating an example of assigning state messages to dedicated message queues. As shown in FIG. 6, a priority 1 dedicated message queue may be larger than a priority 2 or a priority 3 dedicated message queue, and there may be more resources (e.g., 8 consumers) associated with the priority 1 dedicated message queue to reduce the processing time relative to the priority 2 or the priority 3 dedicated message queues. In some embodiments, there may be multiple dedicated message queues associated with a given priority, such as 16 dedicated message queues for priority 1.

We now describe embodiments of an electronic device, which may perform at least some of the operations in the communication techniques. FIG. 7 presents a block diagram illustrating an example of an electronic device 700 in accordance with some embodiments, such as one of: base station 108, one of electronic devices 110, computer system 112, one of access points 116, one of radio nodes 118, switch 128 or controller 130. This electronic device includes processing subsystem 710, memory subsystem 712, and networking subsystem 714. Processing subsystem 710 includes one or more devices configured to perform computational operations. For example, processing subsystem 710 can include one or more microprocessors, graphics processing units (GPUs), ASICs, microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include DRAM, static random access memory (SRAM), and/or other types of memory. In some embodiments, instructions for processing subsystem 710 in memory subsystem 712 include: one or more program modules or sets of instructions (such as program instructions 722 or operating system 724, such as Linux, UNIX, Windows Server, or another customized and proprietary operating system), which may be executed by processing subsystem 710. Note that the one or more computer programs, program modules or instructions may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as antenna nodes 708, e.g., a metal pad or a connector, which can be coupled to the one or more antennas 720, or nodes 706, which can be coupled to a wired or optical connection or link. Thus, electronic device 700 may or may not include the one or more antennas 720. Note that the one or more nodes 706 and/or antenna nodes 708 may constitute input(s) to and/or output(s) from electronic device 700.) For example, networking subsystem 714 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 700 may be adapted or changed using pattern shapers (such as directors or reflectors) and/or one or more antennas 720 (or antenna elements), which can be independently and selectively electrically coupled to ground to steer the transmit antenna pattern in different directions. Thus, if one or more antennas 720 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 700 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Moreover, electronic device 700 may include a user-interface subsystem 730, such as: a mouse, a keyboard, a trackpad, a stylus, a voice-recognition interface, and/or another human-machine interface. In some embodiments, user-interface subsystem 730 may include or may interact with a touch-sensitive display in display subsystem 726.

Electronic device 700 can be (or can be included in) any electronic device with at least one network interface. For example, electronic device 700 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments instructions 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714 and/or of electronic device 700. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 722, operating system 724 (such as a driver for interface circuit 718) or in firmware in interface circuit 718. Alternatively or additionally, at least some of the operations in the communication techniques may be implemented in a physical layer, such as hardware in interface circuit 718.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
   an interface circuit configured to communicate with communication network devices in a network, wherein the computer system is configured to:
   receive, associated with the communication network devices, state messages, wherein the state messages comprise different types of state messages having associated priorities;
   compute identifiers of the state messages based at least in part on second identifiers of clients associated with or connected to the communication network devices, wherein, for a given state message, the computer system is configured to compute an identifier of the given state message based at least in part on a second identifier of a given client associated with the information in the given state message; and
   selectively assign the state messages to dedicated message queues having associated processing priorities based at least in part on the computed second identifiers and the types of state messages, wherein the types of state message comprise report messages and event messages, and
   wherein one or more of the dedicated message queues associated with the event messages have higher priority than a remainder of the dedicated message queues, and the computer system is configured to process the state messages in the one or more of the dedicated message queues with a smaller processing time than the state messages in the remainder of the dedicated message queues.

2. The computer system of claim 1, wherein a given report message comprises operating statistics of the given communication network device during a time interval.

3. The computer system of claim 1, wherein the event messages have a higher priority than the report messages.

4. The computer system of claim 1, wherein the computer system is configured to ensure that event messages in the state messages are not lost during processing.

5. The computer system of claim 1, wherein the second identifier comprises a media access control (MAC) address and the identifier may be a function of the MAC address.

6. The computer system of claim 5, wherein the second identifier is computed by performing a hash of the MAC address.

7. The computer system of claim 1, wherein the second identifiers comprise integers.

8. The computer system of claim 1, wherein the dedicated message queues are associated with subsets of the communication network devices; and
wherein a given dedicated message queue is associated with a given subset of the communication network devices.

9. The computer system of claim 1, wherein one or more of the dedicated message queues having a higher priority than a remainder of the dedicated message queues and the computer system is configured to process the state messages in the one or more of the dedicated message queues before the state messages in the remainder of the dedicated message queues.

10. The computer system of claim 9, wherein the computer system is configured to process the state messages in a given dedicated message queue in order.

11. The computer system of claim 1, wherein the state messages are received from a controller in the network.

12. The computer system of claim 1, wherein the dedicated message queues are associated with consumers that are configured to further process the state messages.

13. A non-transitory computer-readable storage medium for use in conjunction with a computer system, the computer-readable storage medium storing program instructions that, when executed by the computer system, cause the computer system to perform operations comprising:
   receiving, associated with communication network devices in a network, state messages, wherein the state messages comprise different types of state messages having associated priorities;
   computing identifiers of the state messages based at least in part on second identifiers of clients associated with or connected to the communication network devices, wherein, for a given state message, the computer system is configured to compute an identifier of the given state message based at least in part on a second identifier of a given client associated with information in the given state message; and
   electively assigning the state messages to dedicated message queues having associated processing priorities based at least in part on the computed second identifiers and the types of state messages, wherein the types of state message comprise report messages and event messages,
   wherein the event messages have a higher priority than the report messages, and
   wherein one or more of the dedicated message queues associated with the event messages have higher priority than a remainder of the dedicated message queues, and the computer system is configured to process the state messages in the one or more of the dedicated message queues with a smaller processing time than the state messages in the remainder of the dedicated message queues.

14. The non-transitory computer-readable storage medium of claim 13, wherein
the operations comprise ensuring that event messages in the state messages are not lost during processing.

15. The non-transitory computer-readable storage medium of claim 13, wherein the dedicated message queues are associated with subsets of the communication network devices; and
wherein a given dedicated message queue is associated with a given subset of the communication network devices.

16. The non-transitory computer-readable storage medium of claim 13, wherein the second identifier comprises a media access control (MAC) address and the identifier may be a function of the MAC address; and wherein the second identifier is computed by performing a hash of the MAC address.

17. A method for assigning state messages to dedicated message queues, comprising:

by a computer system:
receiving, associated with communication network devices in a network, the state messages, wherein the state messages comprise different types of state messages having associated priorities;
computing identifiers of the state messages based at least in part on second identifiers of clients associated with or connected to the communication network devices, wherein, for a given state message, the computer system is configured to compute an identifier of the given state message based at least in part on a second identifier of a given client associated with information in the given state message; and
selectively assigning the state messages to the dedicated message queues having associated processing priorities based at least in part on the computed second identifiers and the types of state messages, wherein the types of state message comprise report messages and event messages, and wherein one or more of the dedicated message queues associated with the event messages have higher priority than a remainder of the dedicated message queues, and the computer system is configured to process the state messages in the one or more of the dedicated message queues with a smaller processing time than the state messages in the remainder of the dedicated message queues.

18. The method of claim 17, wherein the second identifier comprises a media access control (MAC) address and the identifier may be a function of the MAC address; and
wherein the second identifier is computed by performing a hash of the MAC address.

19. The method of claim 17, wherein the method comprises ensuring that event messages in the state messages are not lost during processing.

20. The method of claim 17, wherein the dedicated message queues are associated with subsets of the communication network devices; and
wherein a given dedicated message queue is associated with a given subset of the communication network devices.

* * * * *